(12) United States Patent
Makhlin et al.

(10) Patent No.: US 6,984,074 B2
(45) Date of Patent: Jan. 10, 2006

(54) ROTATIONALLY ADJUSTABLE FIBER OPTIC CONNECTOR HAVING A PARTIAL KEY RING

(75) Inventors: Ilya Makhlin, Wheeling, IL (US); Aleksander Yazvin, Glenview, IL (US); Vyacheslav Malevanets, Vernon Hills, IL (US); Malcolm R. Phifer, Lisle, IL (US); Barbara Grzegorzewska, Chicago, IL (US); Igor Grois, Northbrook, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/758,471

(22) Filed: Jan. 15, 2004

(65) Prior Publication Data

US 2004/0264877 A1    Dec. 30, 2004

Related U.S. Application Data

(63) Continuation-in-part of application No. 10/602,513, filed on Jun. 24, 2003.

(51) Int. Cl.
G02B 6/36    (2006.01)

(52) U.S. Cl. .......................................... 385/78; 385/76
(58) Field of Classification Search ................. 385/78, 385/72, 55, 60, 66, 67, 90, 76
See application file for complete search history.

(56) References Cited

U.S. PATENT DOCUMENTS

| 4,028,917 | A | * | 6/1977 | Schlage ........................ 70/389 |
| 5,216,733 | A | | 6/1993 | Nagase et al. ................. 385/60 |
| 5,668,905 | A | | 9/1997 | Takahashi et al. | |
| 5,946,436 | A | | 8/1999 | Takashi | |
| 6,056,577 | A | * | 5/2000 | Blanchet ....................... 439/352 |
| 6,151,432 | A | * | 11/2000 | Nakajima et al. .............. 385/60 |
| 6,200,040 | B1 | * | 3/2001 | Edwards et al. ............... 385/78 |
| 6,254,372 | B1 | | 7/2001 | Morikawa et al. ............. 385/60 |
| 6,264,372 | B1 | | 7/2001 | Pianciola et al. | |
| 6,533,468 | B2 | * | 3/2003 | Nakajima et al. .............. 385/78 |
| 6,551,839 | B2 | * | 4/2003 | Jovanovich et al. ......... 436/180 |
| 6,655,851 | B1 | * | 12/2003 | Lee .............................. 385/78 |
| 2002/0126961 | A1 | * | 9/2002 | Hirabayashi e al. ........... 385/78 |
| 2003/0161586 | A1 | | 8/2003 | Hirabayashi | |

FOREIGN PATENT DOCUMENTS

WO    WO 02/079840 A1    10/2002

OTHER PUBLICATIONS

International Search Report for International Application No. PCT/US2004/018781 mailed on Sep. 15, 2004.

* cited by examiner

*Primary Examiner*—Chandrika Prasad
(74) *Attorney, Agent, or Firm*—Romi N. Bose

(57) ABSTRACT

A fiber optic connector assembly includes an outer connector housing defining an optic axis in a through passage. A first key is disposed in the passage at a given position angularly about the axis. An inner optical fiber plug terminates an optical fiber and is disposed in the passage and includes a second key movably positionable about the periphery of the plug to different selected positions of rotational adjustment for the plug. The second key is fixable at any selected position on the plug and is lockable with the first key on the housing to fix the angular position of the plug relative to the housing and, thereby, fix the rotational position of the optical fiber angularly of the optic axis.

18 Claims, 6 Drawing Sheets

ROTATIONALLY ADJUSTABLE FIBER OPTIC CONNECTOR HAVING A PARTIAL KEY RING

The application is a continuation-in-part of U.S. patent application Ser. No. 10/602,513, filed on Jun. 24, 2003.

FIELD OF THE INVENTION

This invention generally relates to the art of fiber optic connectors and, particularly, to a connector wherein an optical fiber is angularly adjustable about its axis and is maintainable in a selected rotational position of adjustment.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule that mounts and centers an optical fiber or fibers within the connector. The ferrule may be fabricated of such material as ceramic. A ferrule holder or other housing component of the connector embraces the ferrule and may be fabricated of such material as molded plastic. A spring typically is disposed within the housing or ferrule holder such that the ferrule is yieldably biased forwardly for engaging another fiber-mounting ferrule of a mating connector device. In many fiber optic connectors, it is desirable to angularly adjust the optical fiber within the connector relative to the fiber's longitudinal axis to achieve an optimum angular position of the fiber whereat the insertion losses of the connector are at a minimum. In addition, the use of polarization maintaining (PM) fibers has been increasing, and it is essential that the PM fibers be properly angularly oriented within the connector. Systems for angularly adjusting such fibers have been complicated and not very cost effective. The present invention is directed to solving these problems by providing an extremely simple system that includes a fiber optic connector assembly as well as a method for very simply and efficiently adjusting the angular position of a fiber within a fiber optic connector.

SUMMARY OF THE INVENTION

An object, therefore, of the invention is to provide a new and improved fiber optic connector assembly and method of rotationally adjusting an optical fiber within the connector assembly.

In the exemplary embodiment of the invention, a fiber optic connector assembly includes an outer connector housing defining an optic axis in a through passage. A first key is formed in the passage at a given position angularly about the axis. An inner optical fiber plug terminates an optical fiber. The plug is disposed in the passage and includes a second key movably positionable about the periphery of the plug to different selected positions of rotational adjustment for the plug. The second key is fixable at any selected position and is lockable with the first key on the housing to fix the angular position of the plug relative to the housing and, thereby, fix the rotational position of the optical fiber angularly of the optic axis. As disclosed herein, the second key is formed on a key ring that is rotatably mounted about the plug. Therefore, the key ring can be rotated relative to the plug to position the second key at different selected positions of rotational adjustment for the plug.

According to an aspect of the invention, the first key is provided by a recessed keyway in the through passage of the housing. A key member projecting from the key ring forms the second key. In the preferred embodiment, a pair of the keyways is formed at opposite sides of the passage, and a complementary pair of the key members is formed on diametrical opposite sides of the key ring. The recessed keyways are located in a socket in the through passage of the housing for receiving a plug portion of the optical fiber plug. The key ring is disposed about and fixable to the plug portion. In another aspect of the invention, a key member projecting from the socket in the through passage of the housing forms the first key and a recessed keyway in the key ring provides the second key. The invention contemplates an extremely simple means for fixing the key ring to the plug at any selected position of rotational adjustment. Specifically, the key ring is fixable to the plug by an adhesive injected between the key ring and the plug.

Finally, the invention contemplates a method of adjusting the rotational position of the optical fiber using the connector assembly described above.

Other objects, features and advantages of the invention will be apparent from the following detailed description taken in connection with the accompanying drawings.

BRIEF DESCRIPTION OF THE DRAWINGS

The features of this invention that are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 9 is a front elevational view of the connector assembly, with FIGS. 9a and 9b being somewhat schematic illustrations to facilitate an understanding of a PM optical fiber;

DETAILED DESCRIPTION OF THE PREFERRED EMBODIMENT

Figure 1:
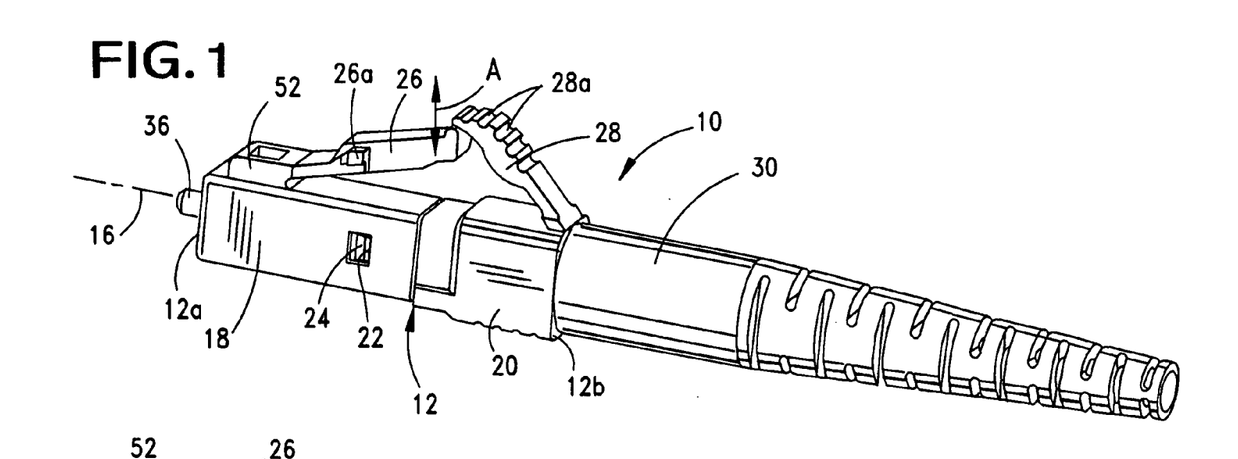
FIG. 1 is perspective view of a fiber optic connector assembly with which the invention is applicable.
Figure 2:
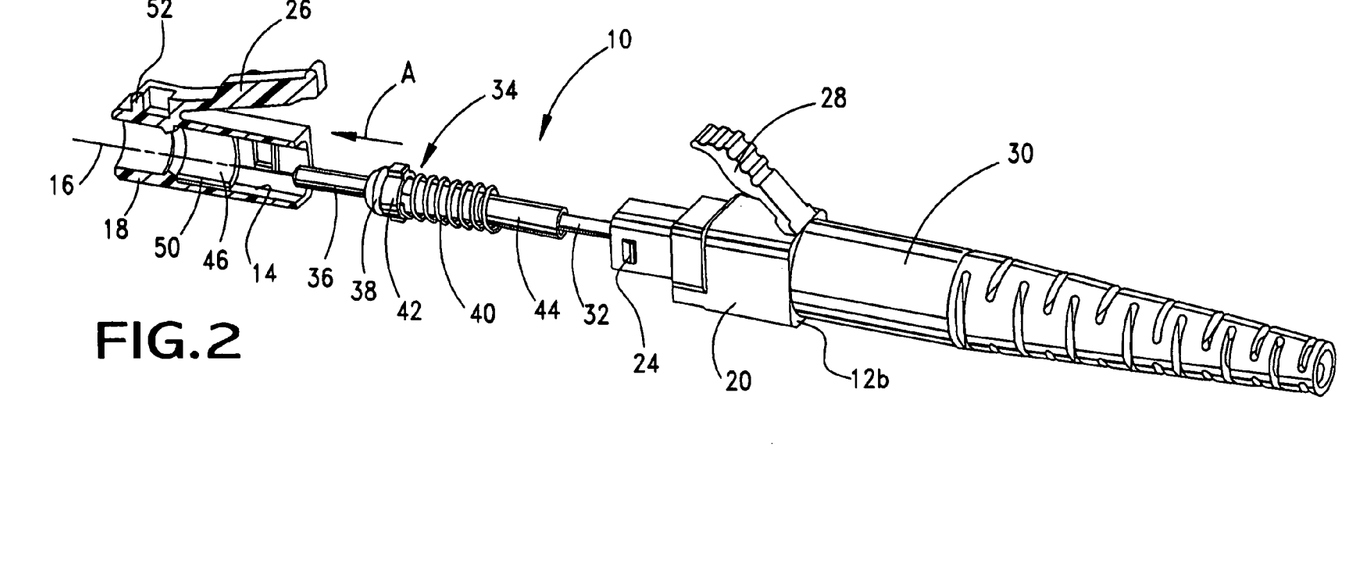
FIG. 2 is an exploded perspective view of the connector assembly, with the front housing part in section.
Figures 3, 4:
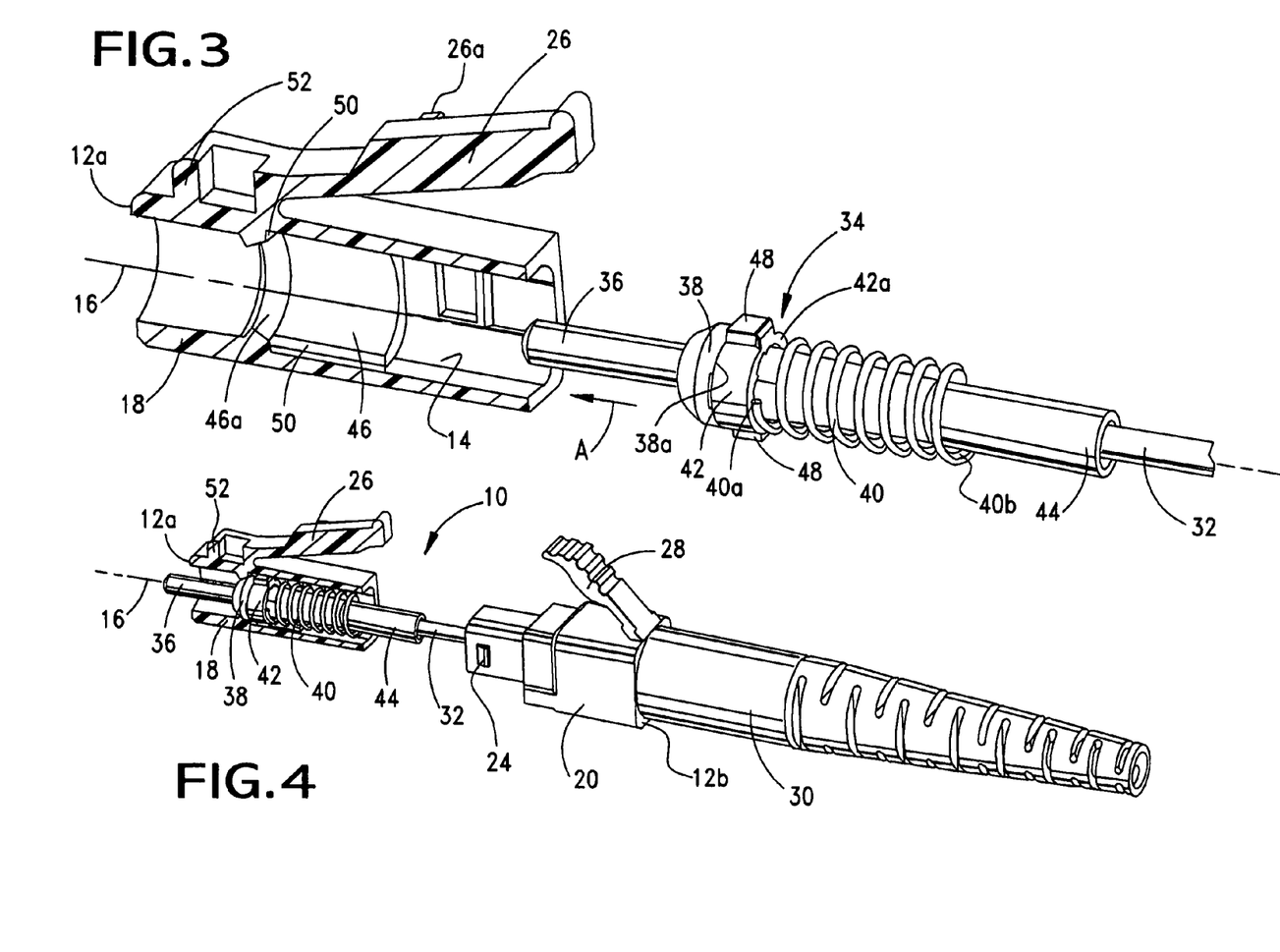
FIG. 3 is an enlarged perspective view of the front housing part and optical fiber plug at the left-hand end of FIG. 2.
FIG. 4 is a view similar to that of FIG. 2, with the plug inserted into the front housing part.

Referring to the drawings in greater detail, and first to FIGS. 1–3, the invention is embodied in a fiber optic connector assembly, generally designated 10, which includes an outer connector housing, generally designated 12, having a front mating end 12a, a rear end 12b and a through passage 14 extending between the ends and defining an optic axis 16. Housing 12 is a two-part housing that includes a front housing part 18 and a rear housing part 20. The front housing part has a pair of latch openings 22 in opposite sides thereof for receiving a pair of chamfered latch bosses 24 on opposite sides of rear housing part 20 when the housing parts are assembled as seen in FIG. 1. Typically, the housing parts are molded of plastic material whereby latch bosses 24 snap automatically into latch openings 22 when the housing parts are assembled. The front housing part also has a latch arm 26 that is flexible in the direction of double-headed arrows "A". The latch arm has a pair of latching ears 26a on opposite sides thereof for latching engagement with appropriate latch means on a complementary mating connector, a mating adapter or other mating optical transmission device. Rear housing part 20 has a flexible actuator arm 28 having a serrated top surface 28a, for engagement by an operator, such as an operator's thumb, for depressing latch arm 26 downwardly toward the connector assembly. Pressing down on actuator arm 28 depresses flexible latch arm 26 that is effective to unlatch latching ears 26a from appropriate latch means on the mating connector, thereby allowing unmating of the connectors. Finally, a strain relief boot 30 projects rearwardly of the rear housing part to provide strain relief for a fiber optic cable 32.

An inner optical fiber plug, generally designated 34 (FIGS. 2 and 3), is provided for terminating at least one optical fiber of fiber optic cable 32. The plug is disposed in through passage 14 in housing 12 as is seen best in FIG. 5. The plug is disposed in the through passage for limited axial movement therein, as will be apparent hereinafter, the limited axial movement being on optic axis 16.

Optical fiber plug 34 includes a ferrule 36 that mounts and centers the optical fiber of fiber optic cable 32, on optic axis 16. The ferrule may be fabricated of such material as ceramic. A ferrule holder 38 embraces the ferrule and may be fabricated of such material as molded plastic. A coil spring 40 surrounds a rear tubular portion 44 of the optical fiber plug. The rear tubular portion may be integral with ferrule holder 38. The ferrule holder is larger in diameter than the rear tubular portion. A key ring 42 surrounds the rear tubular portion and abuts against a rear surface 38a of ferrule holder 38. A front end 40a of coil spring 40 engages a rear surface 42a of key ring 42. A rear end 40b of the coil spring abuts against a shoulder (not visible in the drawings) within rear housing part 20.

Figure 5:
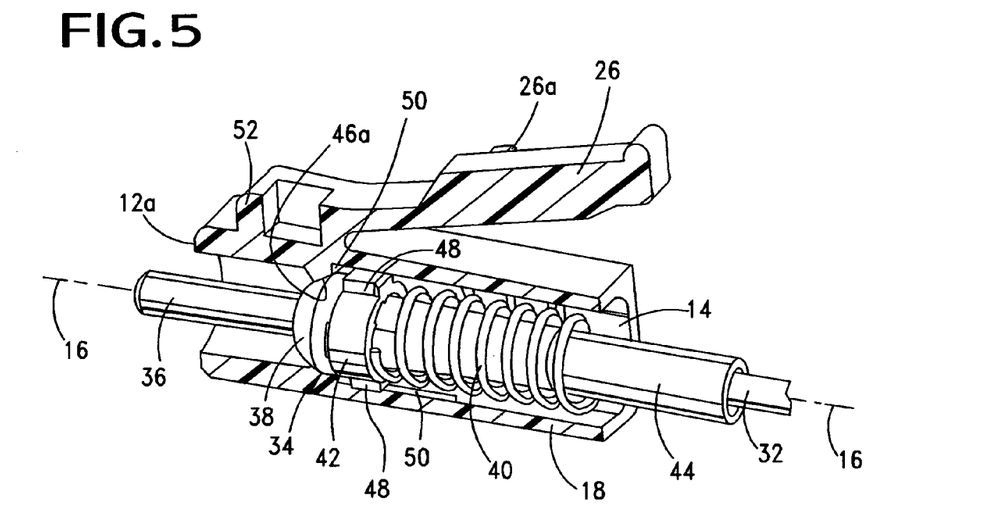
FIG. 5 is a view similar to that of FIG. 3, but with the plug inserted into the front housing part.
Figure 6:
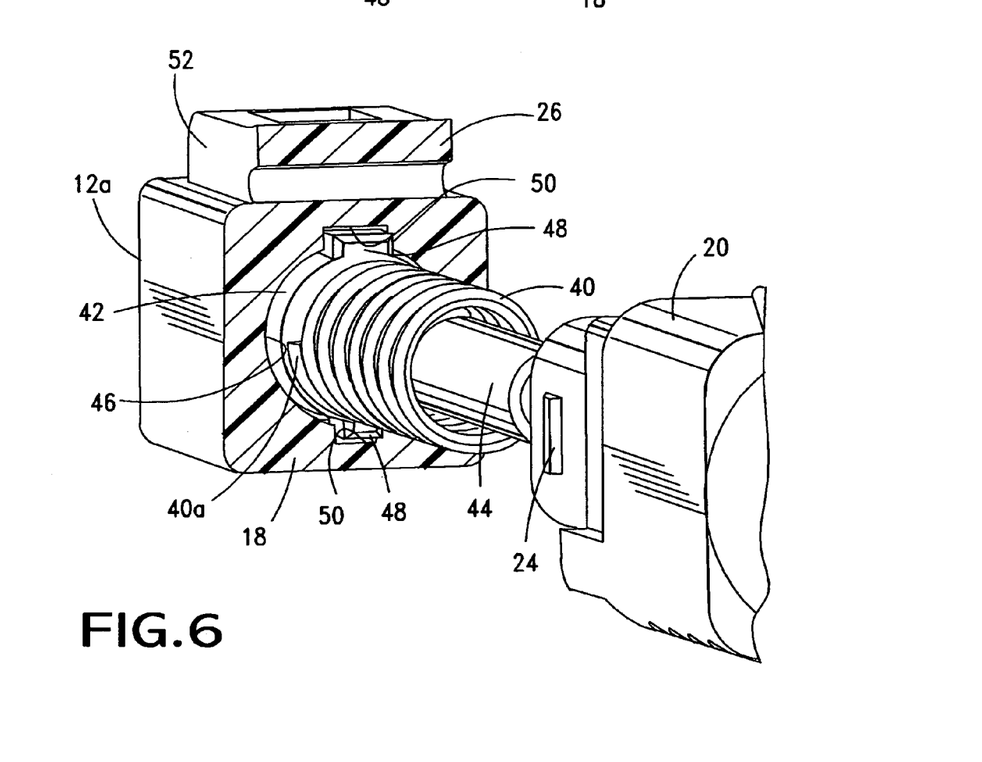
FIG. 6 is a vertical section through the front housing part to show the interengagement of the keys on the key ring with the keyways in the through passage of the front housing part.

Inner optical fiber plug 34 is inserted into front housing part 18 in the direction of arrows "A" (FIGS. 2 and 3). Referring to FIGS. 4–6 in conjunction with FIGS. 2 and 3, a socket 46 (FIG. 6) is formed within through passage 14 of front housing part 18 for receiving ferrule holder 38 and key ring 42 of inner optical fiber plug 34. The ferrule holder abuts a front shoulder 46a (FIG. 5) of socket 46 under the biasing of coil spring 40. The key ring includes a pair of radially outwardly projecting keys 48 on diametrically opposite sides of the key ring. Socket 46 includes a pair of axially extending keyways 50 formed therein for receiving keys 48 as seen most clearly in FIG. 6. Therefore, it can be understood that, if key ring 42 is fixed to inner optical fiber plug 34, the angular position of the plug within front housing part 18 and, thereby, connector assembly 10, also is fixed due to the positioning of keys 48 in keyways 50. FIG. 6 shows that the top key 48 and keyway 50 are wider than the bottom key and keyway. This ensures that the optical fiber plug and optical fiber are inserted into the front housing part in only one orientation. It is to be noted that the key ring 42, in an alternate embodiment (not shown), is formed such that it includes the keyway. Accordingly, the socket 46 is formed with axially extending keys. Coupling and decoupling operations of the socket 46 and key ring 42, as described above, therefore remains unchanged.

Before proceeding with further details of the invention, it should be understood that fiber optic connector assemblies, such as assembly 10, typically are "keyed" to the complementary mating connector, mating adapter or other mating optical transmission device. This "keying" is accomplished by the vertical orientation of latch arm 26 and, especially, a front mounting portion 52 of the latch arm. As is clearly seen in FIG. 6, mounting portion 52 and, likewise, latch arm 26 are "keyed" in a vertical direction. Correspondingly, keyways 50 in the front housing part and keys 48 on key ring 52 similarly are "keyed" or aligned in this common vertical direction. Therefore, it can be understood that the angular orientation of inner optic fiber plug 34 and the optical fiber that is terminated thereby, can be keyed or polarized to the entire keyed orientation of the connector assembly.

Figures 10, 12:
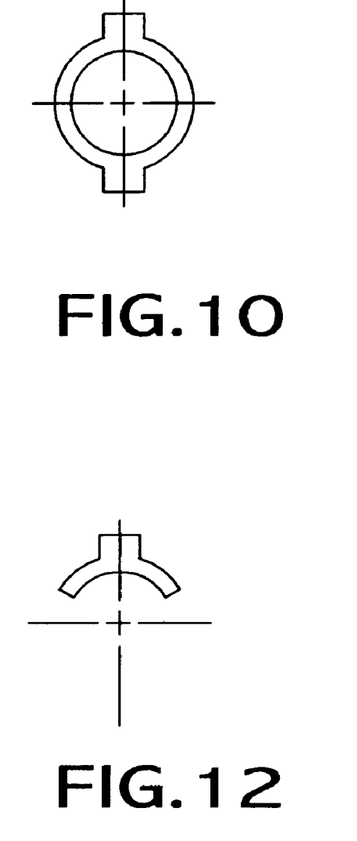
FIG. 10 is a front elevational view of a full key ring configured with two keys.
FIG. 12 is a front elevational view of a partial key ring configured with a single key.
Figures 11, 13:
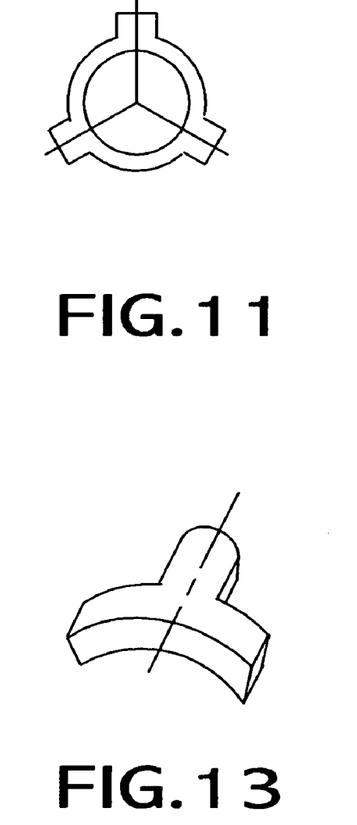
FIG. 11 is a front elevational view of a full key ring configured with three keys.
FIG. 13 is a perspective view of a partial key ring configured with a single key.
Figure 14:
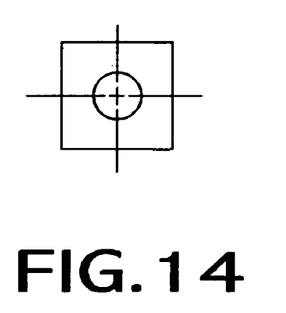
FIG. 14 is a front elevational view of a full key ring configured as a square-shaped device.
Figure 15:
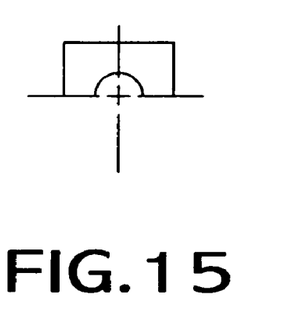
FIG. 15 is a front elevational view of a partial key ring configured with a half square shape.

FIGS. 10–15 illustrate several embodiments of various key rings having one or more keys. As shown, the key rings may be full or partial key rings. Accordingly, prior or subsequent references herein pertaining to key rings encompass both full and/or partial key rings. By way of example only, FIG. 10 shows a full key ring having two keys. Such a key ring may be used, for example, in an SC, LC, BSC and/or BLC type connector. FIG. 11 shows another full key ring, but having three keys. This key ring also may be used in the types of connectors in which the key ring of FIG. 10 is used. The partial key ring shown in FIG. 12 includes a single key and may be used in ST and ST II type connectors. Similarly, the partial key ring shown in FIG. 13 also includes only a single key. This type of partial key ring may be used in FC type connectors. FIG. 14 once again illustrates a full key ring, but in a square shape. This type of key ring may be used in MU connectors. FIG. 15 also shows an MU compatible key ring, but configured as a half square in this instance. It is to be noted that other shapes for the full and partial key rings are possible as well, depending on the type of connector.

Still further, it should be understood that connector assembly 10 is but one example of a connector assembly with which the invention is applicable. In the industry, connector assembly 10 is called an "LC" connector, but the invention is equally applicable for "SC" connectors or other connector configurations.

Generally, the invention contemplates a system for rotationally adjusting inner optical fiber plug 34 angularly about optic axis 16 to thereby rotationally adjust the angular position of the optical fiber within fiber optic cable 32, relative to keys 48 and keyways 50. Once the optical fiber plug (and optical fiber) are rotationally adjusted, the plug can be fixed in a selected position of adjustment and maintained thereat in relation to the entire keying system of the connector assembly, as described above.

Figures 7, 8:
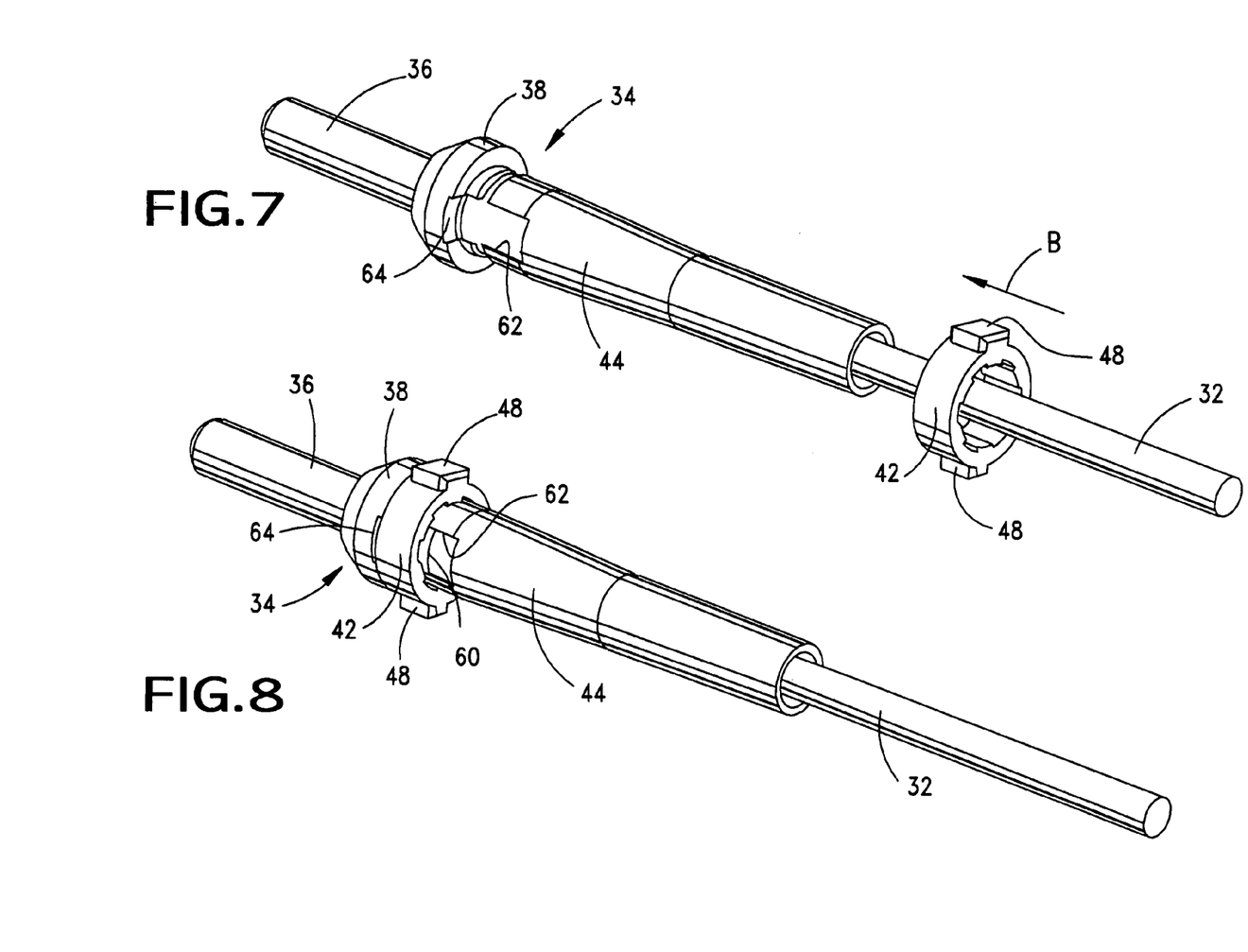
FIG. 7 is a perspective view showing the key ring about to be assembled to the optical fiber plug.
FIG. 8 is a view similar to that of FIG. 7, but with the key ring assembled and fixed to the plug.

Specifically, FIG. 7 shows key ring 42 removed from its assembled position about rear tubular portion 44 of optical fiber plug 34. In actual practice, if the plug is terminating a conventional optical fiber of fiber optic cable 32, plug 34 is "tuned" in order to achieve the optimum angular orientation of the fiber relative to the keyed connector assembly. As is known in the art, tuning is achieved by placing a component, such as plug 34, in a measuring apparatus that simulates the connector assembly. The insertion losses of the plug (i.e., the optical losses of the optical fiber) are measured in a given rotary position of the plug. An operator continues to rotate the plug until the measuring apparatus indicates the position of optimum orientation whereat the insertion losses are at a minimum. Key ring 42 then is moved forwardly in the direction of arrow "B" (FIG. 7) until the key ring is abutted against ferrule holder 38 as shown in FIG. 8. This is done while holding the plug in its optimum angular orientation. Adhesive 60 (FIG. 8) then is applied between the inside of the key ring and the outside of tubular member 44 to maintain the key ring in its vertical orientation, as shown. The outside of tubular member 44 may be provided with a trough 62, and the inside face of ferrule holder 38 may be provided with a recess 64, for receiving a sufficient amount of the adhesive material 60. Now, with keys 48 of key ring 42 being fixed in the vertical direction, and the fiber terminated within ferrule 36 being in its optimum angular orientation, the optical fiber plug and fixed key ring are inserted into socket 46 of front housing part 18 as shown above and described in relation to FIGS. 4–6. It now can be understood that the optimum angular orientation of the optical fiber within fiber optic cable 32 is keyed to the entire vertical keying system of the connector assembly allowed by mounting portion 52 (FIG. 6) of the front housing part, as described above. With plug 34 being freely rotatable within key ring 42 during timing of the plug, an infinite number of relative positions of angular adjustment are afforded.

Figures 9, 9A, 9B:
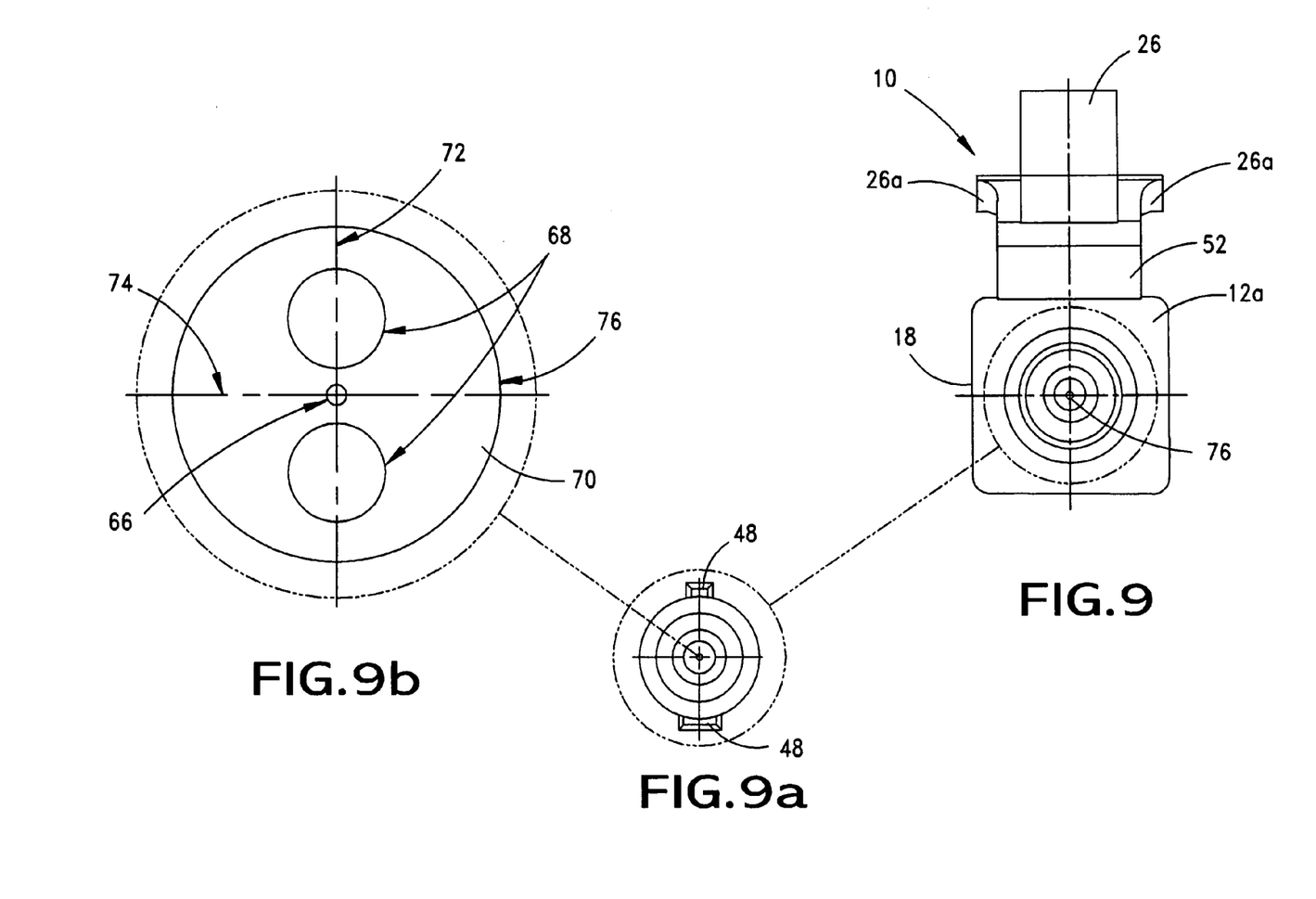

Although the invention has been described above in relation to a conventional optical fiber, the invention has considerable advantages when terminating a polarization maintaining (PM) fiber described below in relation to FIGS. 9, 9a and 9b. First, a general background of PM fibers might be useful herein. In particular, a very useful property of light that is utilized in fiber optics is the phenomena of polarization. Many fiber optic applications today are affected by the polarization of the light traveling through the fiber. Polarization dependent losses can adversely affect system performance. Therefore, analyzing, controlling and manipulating the polarization state of light in a fiber has become increasingly important. There are different types of polarized light, but the simplest type is "linearly" polarized light in which the electromagnetic field oscillates in a section plane. In most applications, it is desirable to preserve this form of polarization. It might be theoretically possible to produce perfectly linearly polarized light, but in actual practice, this is not the case. The polarization-extinction ratio (E) gives a measure of the portion of the beam that is linearly polarized along a single axis. ER meters are used for this purpose.

With the above background of light polarization, it should be understood that when a normal optical fiber is bent or twisted, stresses are induced in the fiber. These stresses, in turn, will change the polarization state of light traveling through the fiber. If the fiber is subjected to any external perturbations, such as changes in the fiber's position or temperature, the final output polarization will vary. This is true for even short lengths of fiber and is undesirable in many applications that require a constant output polarization from the fiber. In order to solve these problems, polarization maintaining (PM) fibers have been developed whereby the light polarized along one axis of the fiber travels at a different rate than light polarized orthogonal to that axis. This birefringent behavior creates two principal transmission axes within the fiber, known as the fast and slow axes. If the input light into a PM fiber is linearly polarized and oriented in a certain direction, the output light from the fiber will also be linearly polarized and oriented in the same direction. FIG. 9b shows one type of PM fiber that has the ability to maintain a linear polarization state. The fiber has a core 66 in which two propagation paths are created. In other words, light coupled to the PM fiber is split into two orthogonal axes. Ideally, the light travels independently along each axis. Linearly polarized light launched into one axis will propagate solely along that axis. The two axes may be created in the fiber either by changing the shape of the core or by applying asymmetric stress in the core. FIG. 9b shows a fiber employing stress-induced method.

Specifically, a pair of stress rods 68 (FIG. 9b) are embedded in the cladding 70 of the fiber. A plane 72 through the stress rods is referred to as the "slow axis". A perpendicular plane 74 is called the "fast axis". The terms "slow" and "fast" refer to the relative propagation velocity in each axis. By comparing FIG. 9b with FIG. 9a, it can be understood that if the PM fiber, generally designated 76, is terminated within the optical fiber plug such that one of the axes (e.g., slow axis 72) is aligned with keys 48 (FIG. 9a), the PM fiber can be keyed to the entire vertical keying arrangement of connector assembly 10 described above. This is important because the angular orientation of PM fiber 76 in connector assembly 10 must be rotationally aligned with a PM fiber of a complementary mating connector or other fiber optic transmission device. In other words, rotational alignment is required in connecting two PM fibers at a connector interface. The invention herein is very useful in achieving these goals, while the connector assembly still is applicable for maintaining the angular orientation of a normal optical fiber. The principal difference is rather simple. The angular orientation of optical fiber plug 34 for a normal fiber is "tuned" in a measuring apparatus that measures optical losses, whereas the PM fiber is tested in an ER meter. Otherwise, the method of the invention is the same for either fiber. Plug 34 is rotated to its optimum angular orientation; key ring 42 is fixed onto the plug while holding the plug at its optimum angular orientation, and then the key ring is used to precisely align the inner optical fiber plug with the vertical keyed orientation of the connector assembly as described above.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A fiber optic connector assembly, comprising:
    an outer connector housing having a front mating end, a rear end and a through passage extending between the ends and defining an optic axis, the housing having a first key in the passage at a given position angularly about the optic axis;
    an inner optical fiber plug for terminating at least one optical fiber of a fiber optic cable, the plug being disposed in the through passage in the housing with a front ferrule portion of the plug terminating the optical fiber at the front mating end of the housing, with the fiber optic cable extending from the rear end of the housing; and a partial key ring rotatably mounted about the plug and fixable on the plug at selected positions of rotational adjustment, the key ring having a second key lockable with the first key on the housing once the key ring is fixed on the plug, the partial key ring configured to enable the plug to be inserted only at a predetermined angle of rotation;

wherein the plug can be rotated to the optimum position of angular adjustment of the optical fiber relative to the optic axis, the key ring can be fixed to the plug with the second key on the key ring aligned with the first key on the housing, and the keys can be locked to fix the angular position of the plug relative to the housing.

2. The fiber optic connector assembly of claim 1 wherein said first key comprises a recessed keyway in the through passage of the housing, and said second key comprises a key member projecting from the key ring.

3. The fiber optic connector assembly of claim 2, including one pair of said keyways extending from one side to an opposite side of the passage, and a complementary pair of key members on diametrical opposite sides of the key ring.

4. The fiber optic connector assembly of claim 2 wherein said recessed keyway is located in a socket in the through passage of the housing for receiving a plug portion of the optical fiber plug, the key ring being disposed about and fixable to the plug portion.

5. The fiber optic connector assembly of claim 1 wherein said key ring is fixable to the optical fiber plug at any of said selected positions by an adhesive.

6. The fiber optic connector assembly of claim 1 wherein said first second key comprises a recessed keyway in the key ring and said first key comprises a key member projecting from the through passage of the housing.

7. A fiber optic connector assembly, comprising:

an outer connector housing defining an optic axis in a through passage, with a first key in the passage at a given position angularly about the axis; and an inner optical fiber plug disposed in the passage and including a second key movably positionable about the periphery of the plug to different selected positions of rotational adjustment for the plug, the plug terminating an optical fiber, and the second key being fixable on the plug at any selected position and lockable with the first key on the housing to fix the angular position of the plug relative to the housing and, thereby, fix the rotational position of the optical fiber angularly of the optic axis, wherein the second key is provided on a partial key ring having one or more keys arranged thereon, the partial key ring configured to enable the plug to be inserted only at a predetermined angle of rotation.

8. The fiber optic connector assembly of claim 7 wherein said first key comprises a recessed keyway in the through passage of the housing, and said second key comprises a key member for projection into the recessed keyway.

9. The fiber optic connector assembly of claim 8, including a pair of said keyways extending from one side of the passage to the opposite side of the passage, and a complementary pair of key members on diametrical opposite sides of the key ring.

10. The fiber optic connector assembly of claim 8 wherein said recessed keyway is located in a socket in the through passage of the housing for receiving a plug portion of the optical fiber plug, the key ring being disposed about and fixable to the plug portion.

11. The fiber optic connector assembly of claim 7 wherein said second key is fixed to the optical fiber plug at any position of rotational adjustment by an adhesive.

12. The fiber optic connector assembly of claim 7 wherein said first key comprises a recessed keyway in the key ring and said second key comprises a key member projecting from the through passage of the housing.

13. A method of adjusting the rotational position of an optical fiber angularly of an optic axis in a fiber optic connector assembly, comprising the steps of:

providing an outer connector housing defining the optic axis in a through passage of the housing and with a first key in the passage at a given position angularly about the axis;

positioning an optical fiber plug in the passage with a second key on the plug lockable with the first key on the housing, and the second key being movably positionable about the periphery of the plug to different selected positions of rotational adjustment for the plug, and with the plug terminating an optical fiber;

rotating the plug relative to the second key to a selected position of rotational adjustment corresponding to an optimum angular position of the optical fiber;

fixing the second key to the plug at said selected position of angular adjustment; and locking the first and second keys to hold the plug in the selected position of angular adjustment wherein the second key is provided on a partial key ring, the partial key ring configured to enable the plug to be inserted only at a predetermined angle of rotation.

14. The method of claim 13, including providing said first second key as a recessed keyway in the through passage in the housing, and providing said first key as a key member projecting from the key ring.

15. The method of claim 13, including providing a pair of said keyways extending from one side to an opposite side of the passage, and providing a complementary pair of key members on diametrical opposite sides of the key ring.

16. The method of claim 13, including locating said recessed keyway in a socket in the through passage of the housing for receiving a plug portion of the optical fiber plug, and disposing the key ring about the plug portion and fixing the key ring thereto.

17. The method of claim 13, including the step of fixing the second key to the optical fiber plug by an adhesive.

18. The fiber optic connector assembly of claim 13 wherein said first key comprises a recessed keyway in the key ring and said second key comprises a key member projecting from the through passage of the housing.

* * * * *